United States Patent
Chang

(10) Patent No.: US 6,389,747 B1
(45) Date of Patent: May 21, 2002

(54) PROCESS FOR REDUCING AN EXISTING LANDFILL

(76) Inventor: Larry Chang, 9 Floor, No. 48, Fu-Hsing N. Rd., Taipei (TW)

( * ) Notice: Subject to any disclaimer, the term of this patent is extended or adjusted under 35 U.S.C. 154(b) by 0 days.

(21) Appl. No.: 09/483,378

(22) Filed: Jan. 12, 2000

(51) Int. Cl.[7] .................................................. A01B 1/00
(52) U.S. Cl. ............................................. 47/58.1; 47/9
(58) Field of Search ...................... 47/9, 58.1; 405/128, 405/129

(56) References Cited

U.S. PATENT DOCUMENTS 5,584,904 A * 12/1996 Dalos .............................. 71/9
5,636,941 A * 6/1997 Davis et al. ................. 405/129
5,649,785 A * 7/1997 Djerf et al. .................. 405/128
5,885,461 A * 3/1999 Tetrault et al. ............. 210/652

* cited by examiner

Primary Examiner—Peter M. Poon
Assistant Examiner—Kevin Jakel
(74) Attorney, Agent, or Firm—Raymond Y. Chan; David and Raymond Patent Group

(57) ABSTRACT

A process for reducing an existing landfill includes the steps of digging up solid waste deposited in the existing landfill, removing plastic made garbage bags to dispose the solid waste packed therein, removing recyclable material from the solid waste, shipping out the recyclable material to a recycling plant, separating nondecomposable material and decomposable material from the solid waste, composting the decomposable material, and disposing of the nondecomposable material.

4 Claims, 2 Drawing Sheets

PROCESS FOR REDUCING AN EXISTING LANDFILL

BACKGROUND OF THE PRESENT INVENTION

1. Field of Invention

The present invention relates to a waste treatment process, and more particularly to a process for reducing an existing landfill, so as to extend the life of the existing landfill while being cost effective.

2. Description of Related Arts

Landfill space for municipal solid waste is rapidly being consumed. To address this concern, some municipalities have resorted to incinerating their garbage in lieu of depositing their garbage into landfills. However, using incinerators is problematic because they are expensive to run. Especially in Asian countries, such as Taiwan and Hong Kong, the high moisture content in solid waste impedes the incinerators from running at maximum efficiency because the incinerators must expend extra energy in order to evaporate off the moisture in the waste. Another major disadvantage in using incinerators is that incinerators release much pollution into the atmosphere.

A second proposed solution is to reduce the amount of garbage deposited into landfills by enacting recycling programs where individuals presort recyclable material from their garbage. However, recycling programs are often ineffectual in reducing the amount of garbage because many individuals in actuality do not separate recyclable material from their garbage. Furthermore, by the nature of many business establishments and public trashcans, the separation of recyclable material from the garbage before the garbage is collected is impracticable. As a consequence, much recyclable material is not separated from the garbage before it is collected.

A third proposed solution is to remove recyclable material after the garbage has been collected. This proposal is ineffective because individuals and businesses often deposit their garbage into plastic bags. The plastic bags impede efforts to separate recyclable material from the garbage because the garbage is trapped inside the plastic bags. Therefore, much recyclable material is deposited in landfills taking up valuable landfill space. Moreover, the material is not recycled and does not conserve our valuable natural resources.

A problem to all of the proposals is that none address landfills, which are already filled up with garbage. For example, in Taiwan, there are at least fifty five waste disposal area in river beds must be cleaned out and seventy eight full or over filled landfill yards must be processed to extend their service lives.

SUMMARY OF THE PRESENT INVENTION

It is an object of the present invention to provide a comprehensive process for reducing an existing landfill which extends the life of the existing landfill while being cost effective by removing valuable resources from the solid waste that is deposited in the existing landfill.

Another object of the present invention is to provide a process for reducing an existing landfill, which solves the problem of garbage trapped inside plastic bags by removing the plastic bags from the solid waste through specific processing steps. Because the plastic bags are removed from the solid waste, recyclable material can be accessed. Therefore, the solid waste not need have been presorted for recyclable material.

Another object of the present invention is to provide a process for reducing an existing landfill, which lowers the cost of incineration and the amount of pollution released. By removing recyclable material, decomposable material, and excess water from the solid waste, the incinerators have less quantity of matter to burn and thus expend less energy to burn up the solid waste. Furthermore, because these materials are removed from the solid waste before incineration, less pollution is released into the atmosphere. The present process used in conjunction with incineration results in waste that is nearly 100% processed and requires very little landfill space.

Another advantage of the present process is that all the equipment used in the present process can be driven or trailored to the existing disposal area or landfill yard, can be set up on site, and can be operated on any kind of ground condition. Since the equipment does not take up much space and is mobile, the equipment can be set up quickly and cheaply in comparison which traditional processes for the treatment of municipal solid waste.

DETAILED DESCRIPTION OF THE PREFERRED EMBODIMENT

Figure 1:
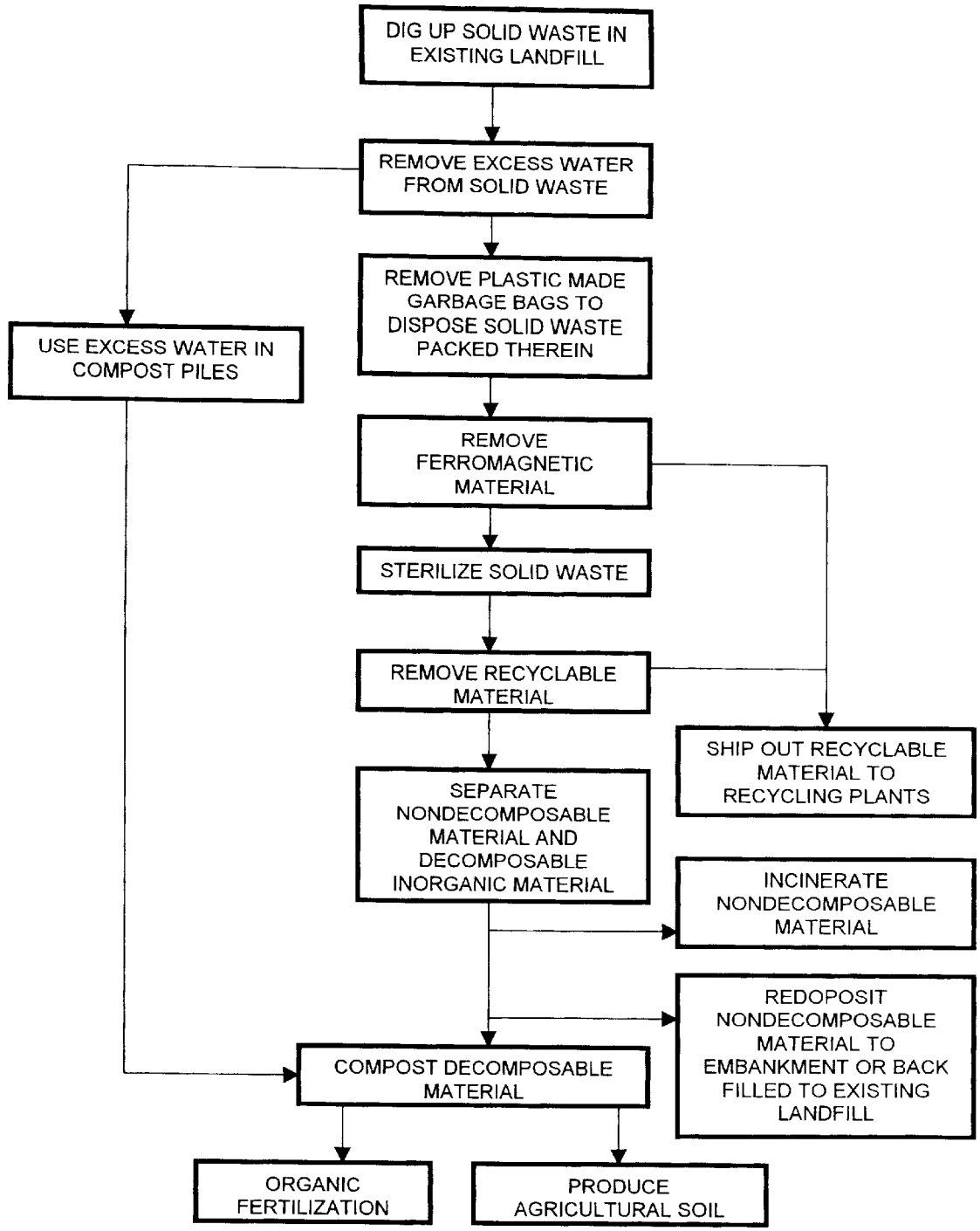
FIG. 1 is a block diagram of a preferred embodiment of the present invention.

The present invention provides a comprehensive process for reducing an existing, landfill, which extends the life of the existing landfill while being, cost effective. FIG. 1 illustrates a preferred embodiment of the process for reducing an existing, landfill according to the present invention. The process for reducing an existing landfill comprises the following steps.

(a) Dig up solid waste deposited in an existing landfill.

(b) Sterilize and deodorize the dug-up solid waste.

In step (b), all the dug-up solid waste is sterilized by using disinfection and deodorization agents which kill germs and insects and which neutralize bad odors. Sterilizing the garbage helps to protect the surrounding community and to ward against opposition from the community against the establishment of a waste processing facility in the area.

(c) Remove all plastic made garbage bags from the dug-up solid waste to also dispose all solid waste packed in the garbage bags.

The fact is, especially in those small and crowded Asian countries such as Taiwan, that most trashes and garbage from residence and business area are packed in plastic made garbage bags and such packed waste were generally buried in the landfill. In order to resort and recycle the recyclable solid waste dug-up from the landfill, the biggest headache is those garbage bags. According to the preferred embodiment of the present invention, the step (c) further comprises the steps of:

(c-1) cutting and ripping open the garbage bags until all the solid waste packed in the garbage bags are disposed; and (c-2) collecting all the garbage bags by using electrostatic forces and/or vacuum system to lift out the garbage bags from the solid waste.

The step (c-1) is carried out within a plastic bag removing machine, wherein the solid waste are separated from garbage bags by cutting open the garbage bags and followed by pressing against the garbage bags to squeeze out the solid waste therein.

In the step (c-2), since all plastic bags contained in the solid waste, including the cutted plastic made garbage bags, are so light in weight that they may electro-statically attach on the inner walls of the plastic bag removing machine and be removed from the plastic bags removing machine by means of a scratching rubber. Besides, the plastic bag removing machine may further comprises the vacuum system to suck up the plastic bags in the solid waste.

(d) Sterilize and deodorize the disposed solid waste from the garbage bags.

(e) Separate insteady organic waste and steady waste from the dug-up solid waste, wherein the insteady organic waste include plants and animal waste, and the steady waste include recyclable waste, such as metals, plastics and rubbers, and non-recyclable waste, such as chemical waste.

(f) Pyrolyse or solidify the steady waste that can not be recycled.

(g) Bio-remedize the insteady organic waste into agricultural soil.

The step (e) further comprises the steps of:

(e-1) sorting out non-decomposable recyclable steady waste such as stones, sands and blocks which are further grinded and screened to form uncontaminated soil;

(e-2) collecting ferromagnetic materials such as iron and steel by magnetic force, e.g. by means of magnetic head pulleys at the ends of conveyor belts;

(e-3) manually sorting to ensure the insteady organic waste and steady waste are separated;

(e-4) re-producing the plastic and rubber of the recyclable steady waste; and (e-5) packing all metallic recyclable steady waste.

In step (e-3) the recyclable steady waste is removed from the solid waste by sending the solid waste on a conveyor belt where workers handpick the recyclable steady waste.

All the recyclable steady waste is shipped out to various recycling plants. The recyclable material can be sent to the recycling plant by using a bailer to package the recyclable material.

Other decomposable steady waste is also composted to produce agricultural soil or fertilizer by utilizing conventional composting methods.

Other non-decomposable and non-recyclable materials that cannot be recycled or recovered are disposed either by redepositing it in the existing landfill or by incineration. The process can include an additional step to remove excess water from the non-decomposable solid waste.

Removing excess water from the non-decomposable and non-recyclable solid waste improves incinerator efficiency because the incinerator does not have to burn off the water. In addition, the excess water can be used in the composting step on the compost piles.

Figure 2:
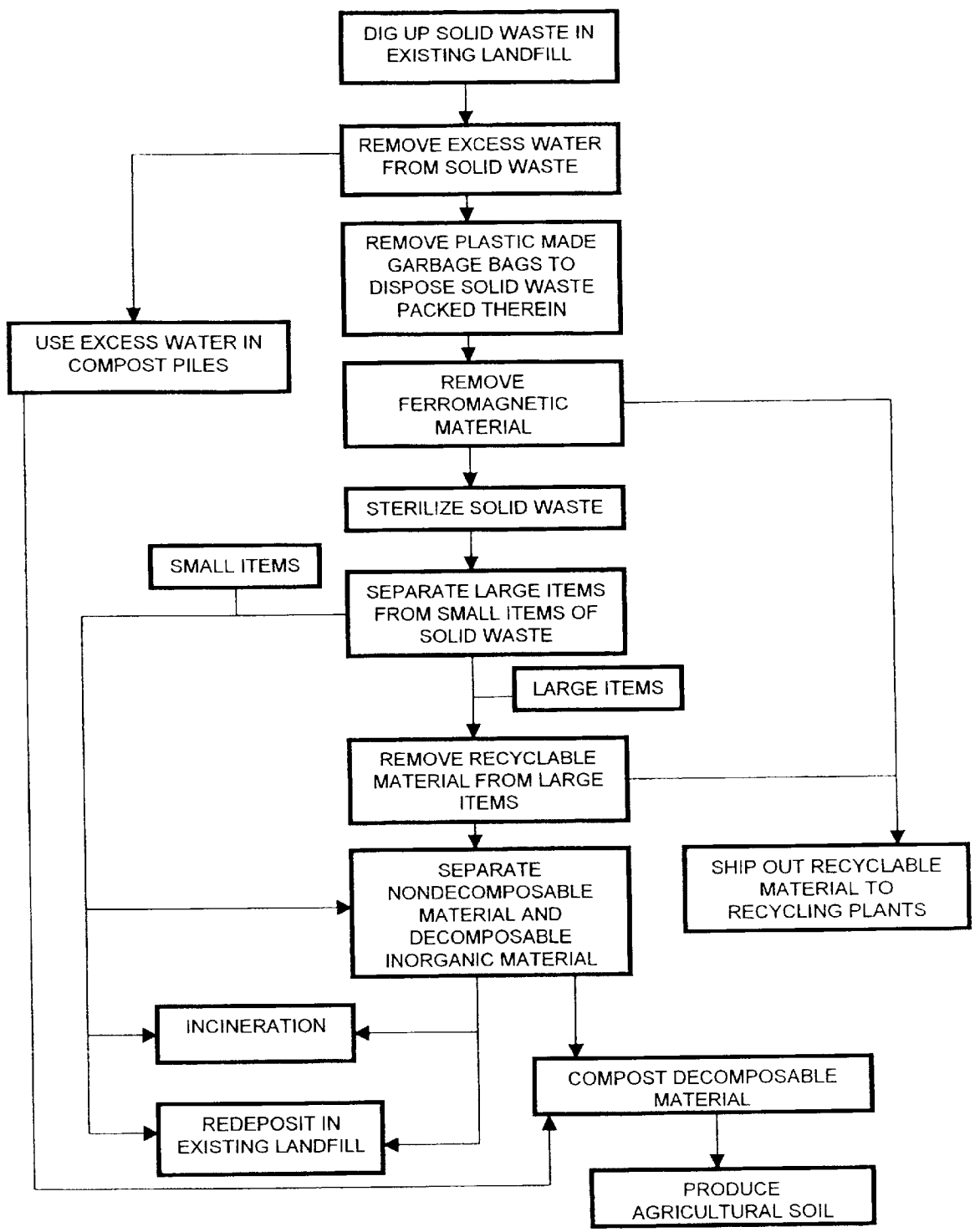
FIG. 2 is a block diagram of an alternate embodiment of the above preferred embodiment of the present invention.

FIG. 2 shows an alternate embodiment of the present invention. The process can include a step where large items and small items are separated from the solid waste before recyclable material is removed from the solid waste. A coarse sorting machine can be used to separate large items from small items. Preferably, large items of the solid waste are at least 11 inches in size whereas small items of the solid waste are less than 11 inches in size. Alternatively, large items of solid waste are at least 4 inches in size whereas small items of solid waste are less than 4 inches in size. The large items are sent on a conveyor belt where recyclable materials are removed from the solid waste by handpicking the recyclable materials from the solid waste. The small items can be incinerated, deposited in the landfill, or further processed with the large items of solid waste after recyclable materials have been removed from the large items of solid waste.

Preferably, the step of removing ferromagnetic material occurs before the step of removing recyclable materials from the solid waste.

While the foregoing description and diagram describe the preferred embodiments of the present invention, it should be appreciated that certain obvious modifications, variations, and substitutions may be made without departing from the spirit and scope of the present invention. The process steps need not be performed exactly in the order as outlined above nor are all the process steps delineated above necessary for practicing the present invention.

What is claimed is:

1. A process for reducing an existing landfill, comprising the steps of:

(a) digging up solid waste deposited in an existing landfill;

(b) cutting and ripping open all plastic made garbage bags of said dug-up solid waste until all said solid waste packed in said garbage bags are disposed, and collecting all said garbage bags by using electrostatic forces and vacuum systems to lift out said garbage bags from said solid waste;

(c) separating insteady organic waste and steady waste from said solid waste by:

(c-1) sorting out recyclable steady waste which is non-decomposable from said solid waste, including stones, sands and blocks, which are further grinded and screened to form uncontaminated soil;

(c-2) collecting ferromagnetic materials of said solid waste by magnetic force;

(c-3) manually sorting to ensure said insteady organic waste and said steady waste are separated, wherein said recyclable steady waste is removed from said solid waste by sending said solid waste on a conveyor belt where workers handpick said recyclable steady waste;

(c-4) re-producing plastic and rubber of said recyclable steady waste; and (c-5) packing all metallic waste of said recyclable steady waste;

(d) pyrolysing or solidifying said steady waste that is non-recyclable;

(e) bio-remedizing said insteady organic waste into agricultural soil; and (f) removing excess water from said solid waste which is non-decomposable, wherein said excess water is used in compost piles.

2. A process for reducing an existing landfill, comprising the steps of:

(a) digging up solid waste deposited in an existing landfill (b) sterilizing and deodorizing said dug-up solid waste;

(c) cutting and ripping open all plastic made garbage bags until all said solid waste packed in said garbage bags are disposed;

(d) collecting said garbage bags by using electrostatic forces and vacuum systems to lift out said garbage bags from said solid waste;

(e) sterilizing and deodorizing said disposed solid waste from said garbage bags;

(f) separating insteady organic waste and steady waste from said dug-up solid waste by (f-1) sorting out recyclable steady waste which is non-decomposable from said solid waste, including stones, sands and blocks, which are further grinded and screened to form uncontaminated soil;

(f-2) collecting ferromagnetic materials of said solid waste by magnetic force;

(f-3) manually sorting to ensure said insteady organic waste and said steady waste are separated, wherein said recyclable steady waste is removed from said solid waste by sending said solid waste on a conveyor belt where workers handpick said recyclable steady waste;

(f-4) re-producing plastic and rubber of said recyclable steady waste; and (f-5) packing all metallic waste of said recyclable steady waste;

(g) pyrolysing or solidifying said steady waste that is non-recyclable;

(h) bio-remedizing said insteady organic waste into agricultural soil;

(i) composting said steady waste which is decomposable to produce agricultural soil and fertilizer; and (j) removing excess water from said solid waste which is non-decomposable.

3. A process for reducing an existing landfill, comprising the steps of:

(a) digging up solid waste deposited in an existing landfill;

(b) cutting and ripping open said garbage bags until all said solid waste packed in said garbage bags are disposed;

(c) collecting all said garbage bags by using electrostatic forces and vacuum systems to lift out said garbage bags from said solid waste;

(d) separating large items and small items from said solid waste, wherein said large items of said solid waste are at least 4 to 11 inches in size whereas said small items of said solid waste are less than 4 to 11 inches in size, wherein said small items are incinerated and redeposited in said existing landfill;

(e) separating insteady organic waste and steady waste from said large items of said solid waste by:

(e-1) sorting out recyclable steady waste which is non-decomposable from said solid waste, including stones, sands and blocks, which are further grinded and screened to form uncontaminated soil;

(e-2) collecting ferromagnetic materials of said solid waste by magnetic force;

(e-3) manually sorting to ensure said insteady organic waste and said steady waste are separated, wherein said recyclable steady waste is removed from said solid waste by sending said solid waste on a conveyor belt where workers handpick said recyclable steady waste;

(e-4) re-producing plastic and rubber of said recyclable steady waste; and (e-5) packing all metallic waste of said recyclable steady waste;

(f) pyrolysing or solidifying said steady waste that is non-recyclable; and (g) bio-remedizing said insteady organic waste into agricultural soil.

4. A process for reducing an existing landfill, comprising the steps of:

(a) digging up solid waste deposited in an existing landfill;

(b) sterilizing and deodorizing said dug-up solid waste;

(c) cutting and ripping open all plastic made garbage bags until all said solid waste packed in said garbage bags are disposed;

(d) collecting said garbage bags by using electrostatic forces and vacuum systems to lift out said garbage bags from said solid waste;

(e) sterilizing and deodorizing said disposed solid waste from said garbage bags;

(f) separating large items and small items from said solid waste, wherein said large items of said solid waste are at least 4 to 11 inches in size whereas said small items of said solid waste are less than 4 to 11 inches in size, wherein said small items are incinerated and redeposited in said existing landfill;

(g) separating insteady organic waste and steady waste from said large items of said solid waste by:

(g-1) sorting out recyclable steady waste which is non-decomposable from said solid waste, including stones, sands and blocks, which are further grinded and screened to form uncontaminated soil;

(g-2) collecting ferromagnetic materials of said solid waste by magnetic force;

(g-3) manually sorting to ensure said insteady organic waste and said steady waste are separated, wherein said recyclable steady waste is removed from said solid waste by sending said solid waste on a conveyor belt where workers handpick said recyclable steady waste;

(g-4) re-producing plastic and rubber of said recyclable steady waste; and (g-5) packing all metallic waste of said recyclable steady waste;

(h) pyrolysing or solidifying said steady waste that is non-recyclable;

(i) bio-remedizing said insteady organic waste into agricultural soil;

(j) composting said steady waste which is decomposable to produce agricultural soil and fertilizer; and (k) disposing said steady waste which is non-decomposable and non-recyclable by incineration.

* * * * *